United States Patent [19]
Bescoby et al.

[11] Patent Number: 5,299,763
[45] Date of Patent: Apr. 5, 1994

[54] AIRCRAFT CABIN AIR CONDITIONING SYSTEM WITH IMPROVED FRESH AIR SUPPLY

[75] Inventors: Frank A. Bescoby, Rancho Palos Verdes; Roy T. Araki, Redondo Beach, both of Calif.

[73] Assignee: AlliedSignal Inc., Morris Township, Morris County, N.J.

[21] Appl. No.: 813,312

[22] Filed: Dec. 23, 1991

[51] Int. Cl.$^5$ .............................................. B64D 13/08
[52] U.S. Cl. ................................. 244/118.5; 415/205; 454/70
[58] Field of Search ................. 244/118.5; 454/70–76; 415/205

[56] References Cited

U.S. PATENT DOCUMENTS

| | | |
|---|---|---|
| 2,479,991 | 8/1949 | Wood . |
| 2,772,621 | 12/1956 | Arnoldi . |
| 3,218,029 | 11/1965 | Woollenweber ................. 415/205 |
| 3,404,538 | 10/1968 | Kinsell . |
| 4,021,215 | 5/1977 | Rosenbush et al. . |
| 4,261,416 | 4/1981 | Hamamoto . |
| 4,374,469 | 2/1983 | Rannenberg . |

*Primary Examiner*—Galen L. Barefoot
*Attorney, Agent, or Firm*—Joseph R. Black; Robert A. Walsh

[57] ABSTRACT

An improved air conditioning system is provided for an aircraft, particularly with respect to providing an enhanced supply of fresh air to the aircraft cabin or cockpit. The system includes a dual inlet turbine driven at least in part by pressurized bleed air from an aircraft engine, wherein the turbine expands and cools the air preparatory to supply thereof as conditioned air to the aircraft cabin. During relatively low altitude operation, the bleed air flow is supplemented by compressed fresh air discharged from a turbine-driven compressor and supplied to the dual inlet turbine. At relatively higher altitude operation, this fresh air flow is bypassed around the turbine for addition to the bleed air flow at a downstream side of the turbine, and the entire nozzle area of the turbine is opened to the bleed air flow.

14 Claims, 3 Drawing Sheets

AIRCRAFT CABIN AIR CONDITIONING SYSTEM WITH IMPROVED FRESH AIR SUPPLY

BACKGROUND OF THE INVENTION

This invention relates generally to air conditioning systems and methods for providing conditioned air to the cabin or cockpit of an aircraft. More specifically, this invention relates to an improved aircraft air conditioning system of the type designed to utilize pressurized bleed air from one or more aircraft engines, wherein the engine bleed air is supplemented by a substantial fresh air inflow throughout a broad range of low to high altitude operation.

Air conditioning and/or cabin pressurization systems for aircraft are generally known in the art wherein engine bleed air is used as a source of fresh air which can be supplied to the aircraft cabin or cockpit at a selected temperature, pressure, and relative humidity. In such systems, a portion of a compressed air supply from an engine compressor is diverted or bled off from the engine to drive a turbine which expands and cools the otherwise heated high pressure air in preparation for supply to the aircraft cabin. The expansion turbine is normally associated with one or more heat exchangers and/or water extraction devices for conditioning the air to the desired parameters for the comfort of cabin occupants. While such systems operate in a generally satisfactory manner, the reduced ambient air pressure at higher altitudes inherently requires an increased proportion of the engine air flow to be diverted to the aircraft cabin to maintain the requisite cabin air flow. This diversion of air from the engine undesirably decreases engine fuel efficiency and thus directly results in increased engine fuel consumption.

In the past, modified aircraft air conditioning systems have been proposed in an effort to reduce requirements for engine air. For example, systems have been developed wherein the expansion turbine is used to drive a compressor which draws in and compresses additional fresh air as a supplement to the engine bleed air. In these systems, the compressed fresh air is added to the engine bleed air to provide a combined pressurized flow which is expanded and cooled by driving passage through the turbine. Unfortunately, however, the decreasing pressure of ambient air at increasing altitude results in excessive compressor power consumption and/or prohibitive compressor pressure boost ratios at high altitude operation. Some systems have attempted to avoid these disadvantages by recirculating cabin air through the compressor during high altitude operation, but this approach generally does not provide the cabin with a desired level of incoming fresh air. Instead, increased fresh air has been available only by increasing the proportion of bleed flow from the engine, with accompanying fuel penalty.

There exists, therefore, a significant need for an improved aircraft cabin air conditioning system designed to provide a substantial fresh air inflow as a supplement to engine bleed air throughout a broad range of low to high altitude operation, and thereby substantially minimize system requirements for engine bleed air to correspondingly improve overall engine fuel efficiency. The present invention fulfills these needs and provides further related advantages.

SUMMARY OF THE INVENTION

In accordance with the invention, an improved air conditioning and pressurization system is provided to supply conditioned air to the cabin or cockpit of an aircraft. The conditioned air flow includes pressurized bleed air from one or more aircraft engines, in combination with a substantial supplemental flow of fresh air irrespective of operational altitude. The supplemental fresh air flow insures supply of substantial fresh air to the aircraft cabin for occupant comfort, while effectively reducing or minimizing engine bleed air flow requirements. As a result, the overall air flow through the engine or engines is increased to permit engine operation at improved fuel efficiencies.

The air conditioning system comprises an air cycle machine having a turbine for expanding and cooling pressurized air supplied thereto. The turbine includes a dual inlet housing defining a substantially full circle turbine scroll subdivided or bifurcated into two nozzle sets extending over opposite semi-annular halves of the turbine scroll. Pressurized bleed air from one or more engines is normally supplied to one of the nozzle sets for rotatably driving the turbine, whereby the bleed air is expanded and cooled. A compressor mounted for rotation with the turbine draws in a parallel supply of fresh air for compression and discharge as the supplemental fresh air flow.

At relatively low altitudes, the supplemental fresh air flow is coupled to the other set of turbine nozzles to assist in rotatably driving the turbine, resulting in expansion and cooling of the thus-combined bleed and fresh air flows for supply to the aircraft cabin. Appropriate heat exchangers and/or water extraction devices may be employed in the system to obtain precise control over the conditioned air parameters.

Alternately, at relatively higher altitudes, a turbine bypass valve diverts the supplemental fresh air flow to a downstream side of the turbine for mixture with the bleed air flow discharged from the turbine. At the same time, a turbine scroll valve opens both nozzle sets within the turbine housing for substantially full circle admission of the bleed air flow for efficient driving of the turbine. The turbine-bypassed fresh air flow, which is normally relatively cool and dry at high altitudes, provides a substantial fresh air inflow at high altitude operation without requiring increased bleed air from the engine.

Other features and advantages of the present invention will become more apparent from the following detailed description and accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
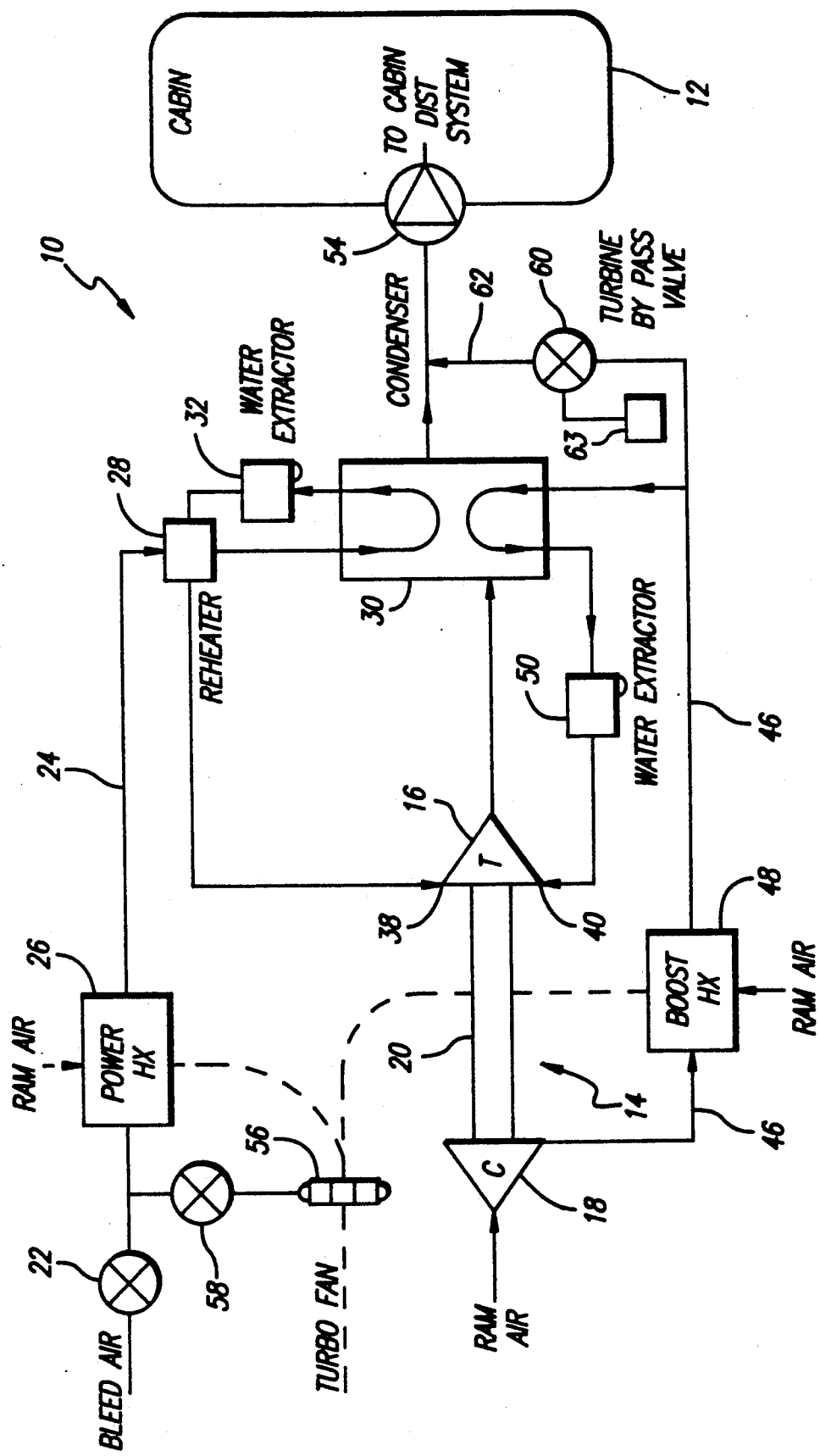
FIG. 1 is a schematic diagram illustrating an aircraft cabin air conditioning system including means for providing improved supply of fresh air to the cabin or cockpit, in accordance with the novel features of the invention.

As shown in the exemplary drawings, an air conditioning system referred to generally in FIG. 1 by the reference numeral 10 is provided for use in supplying conditioned and/or pressurized air to the cabin or cockpit 12 of an aircraft. The improved air conditioning system 10 is designed to provide a substantial quantity of conditioned fresh air at low or high altitude operation, while substantially minimizing system requirements for pressurized bleed air from the aircraft engine or engines. As a result, overall air flow through the engine or engines especially at higher altitudes can be effectively increased to permit increased fuel efficiency and correspondingly decreased fuel consumption.

As shown in FIG. 1, the air conditioning system 10 includes an air cycle machine 14 having a turbine 16 and a compressor 18 mounted on a common shaft 20 for rotation as a unit. In general terms, the turbine 16 is adapted to be rotatably driven by dual air flows consisting of pressurized bleed air from one or more aircraft engines, and pressurized fresh air discharged from the turbine-driven compressor 18. The turbine 16 expands and cools these pressurized air flows, in association with additional heat exchangers and/or water extraction devices to be described, to produce conditioned air at a controlled temperature, pressure and humidity for supply to the aircraft cabin 12.

More particularly, the engine bleed air typically comprises a portion of pressurized air produced by an engine compressor, such as the compressor stage of a gas turbine aircraft engine or the like, wherein the engine compressor stage is provided primarily to increase the mass flow of air through an engine combustor stage for flight propulsion. A portion of this engine compressor air is diverted or bled off as so-called bleed air to the air conditioning system 10. FIG. 1 shows the bleed air flow connected to the air conditioning system through an inflow control valve 22 and a conduit 24 having a heat exchanger 26 subjected to a cross-flow of ram air to reduce the temperature level of the pressurized and thus heated bleed air. The bleed air is directed further through the conduit 24 for series flow through a reheater 28, a condenser 30, and a water extractor 32, followed by cross-flow passage through the reheater 28 and supply to the turbine 16. The reheater 28, condenser 30, and water extractor 32 comprise conventional devices for cooling and removing moisture from the air flow.

Figure 2:
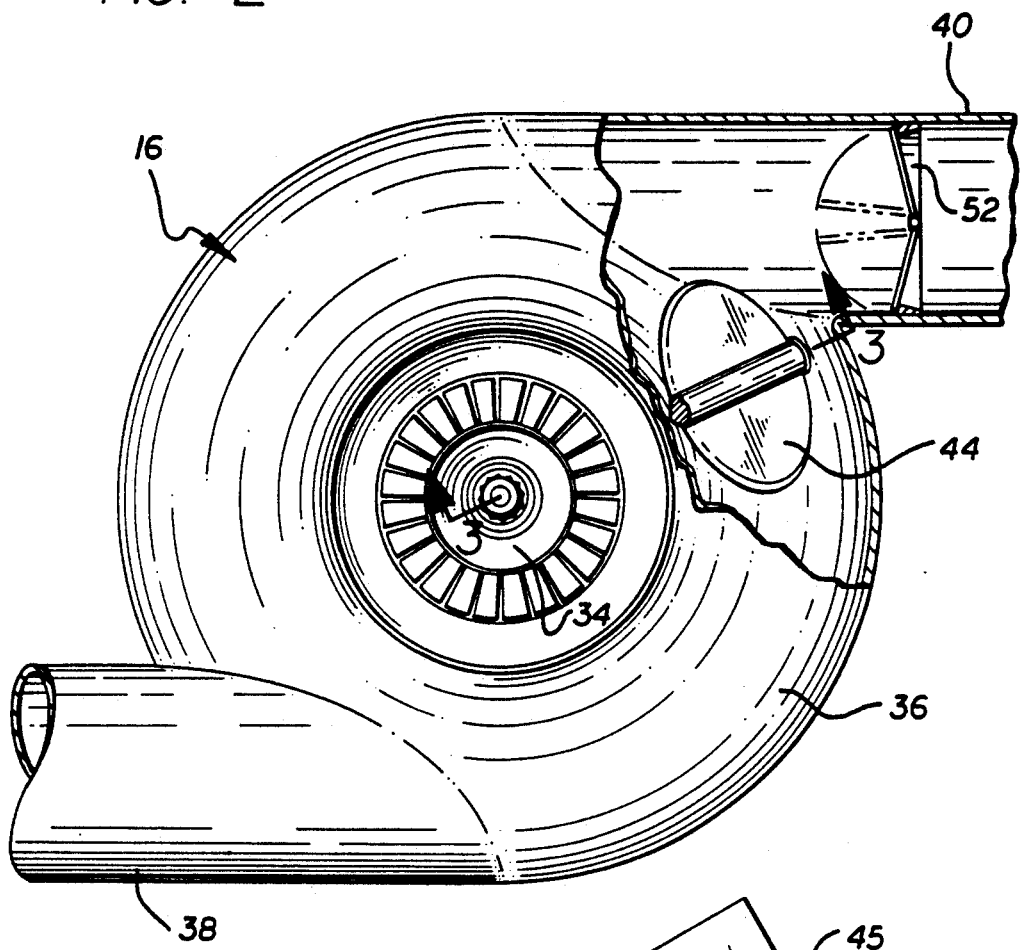
FIG. 2 is a fragmented side elevational view of a dual inlet turbine for use in the air conditioning system of FIG. 1.
Figure 3:
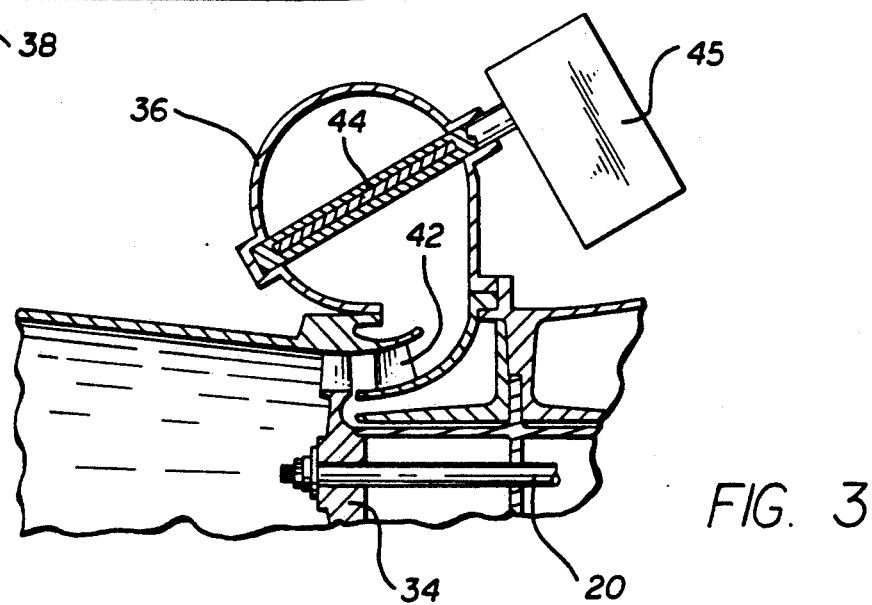
FIG. 3 is a fragmented sectional view taken generally on the line 3—3 of FIG. 2.

As shown in FIGS. 2 and 3, the turbine 16 comprises a rotatable turbine wheel 34 mounted within a turbine housing 36 which defines an annular turbine scroll for substantially full circle admission of pressurized air into driving relation with the turbine wheel. The turbine housing 36 includes a pair of diametrically opposed, generally tangentially oriented inlets 38 and 40. The engine bleed air flow, as described above, is supplied to the turbine housing 36 via the inlet 38 to flow around and fill the turbine scroll, and for passage further through a set of turbine nozzles 42 (FIG. 3) into driving relation with the turbine. Importantly a turbine scroll valve 44 such as a butterfly valve plate or the like is disposed within the turbine scroll at a position generally opposite the bleed air inlet 38 yet slightly upstream from the second inlet 40, whereby the bleed air flow is confined to approximately one-half of the turbine scroll when the scroll valve 44 is closed. In this position, the bleed air flow passes through approximately one-half or one set of the turbine nozzles to drive the turbine wheel 34.

The second air flow inlet 40 of the turbine housing normally receives pressurized fresh air discharged from the turbine-driven compressor 18. As viewed in FIG. 1, this pressurized fresh air comprises incoming ram air which is discharged from the compressor 18 through a flow conduit 46 which may also include a heat exchanger 48 subjected to ram air cross-flow for initial cooling. The compressed fresh air passes further through the condenser 30 and a water extractor 50 prior to supply to the turbine housing 36 via the inlet 40. The fresh air flow is supplied to the turbine housing 36 at an elevated pressure level substantially corresponding with the bleed air pressure, for passage through a one-way inflow check valve 52 (FIG. 2) to fill the other half of the turbine scroll. The fresh air flow is thus admitted through approximately one-half of the turbine scroll and the set of nozzles 42 associated therewith to drive the turbine wheel 34.

The bleed air flow and the supplemental fresh air flow are intermixed upon passage through the turbine housing 36 and are discharged from the the turbine as a combined air flow stream which has been expanded and cooled for delivery through a distribution valve 54 to the aircraft cabin 12.

The dual supply of the bleed air and supplemental fresh air flows to the turbine 16 occur when the aircraft is operated on the ground, or at relatively low altitude wherein the compressor 18 is able to generate compressed air at a pressure matching the bleed air pressure. Alternately, as depicted in FIG. 1, the system is adapted to receive compressed air on the ground from an auxiliary power unit (APU). The turbofan 56 is used to draw cooling air through the ram air heat exchangers 26 and 48.

At higher altitudes whereat ambient air pressure is significantly reduced, such as altitudes above about 15-20,000 feet, a turbine bypass valve 60 diverts the fresh air discharge from the compressor 18 in bypass relation to the turbine 16. That is, as shown in FIG. 1, the bypass valve 60 opens a bypass conduit 62 for redirecting the supplemental fresh air flow away from the turbine inlet 40 for mixture with the bleed air flow at a location downstream of the turbine 16. Accordingly, the supplemental fresh air is mixed with the bleed air at a relatively reduced pressure site in the system, such that excessive compressor power input and/or excessive compressor boost ratios are neither encountered nor required. Instead, the relatively cool, dry, and low pressure ambient air obtained at high altitude is compressed by the compressor 18 and then injected into the cabin air supply at the turbine discharge side. At the same time, the turbine scroll valve 44 (FIGS. 2 and 3) is opened by a suitable actuator 45 to permit the bleed air flow to fill the entire turbine scroll and thereby provide an efficient full circle admission through both nozzle sets for driving the turbine.

The pressurized bleed air within the turbine scroll maintains the check valve 52 in a closed position during this mode of operation to prevent bleed air leakage through the bypass conduit 62. The bypass valve 60 as well as the scroll valve actuator 45 (FIG. 3) can be operated automatically by an altitude responsive controller 63 (FIG. 1), or by any other suitable automatic or manual means. With this configuration, a substantial fresh air flow to the cabin is maintained even during relatively high altitude operation, without requiring significant increases in bleed air flow to the air conditioning system or engine fuel consumption penalties associated therewith.

Figure 4:
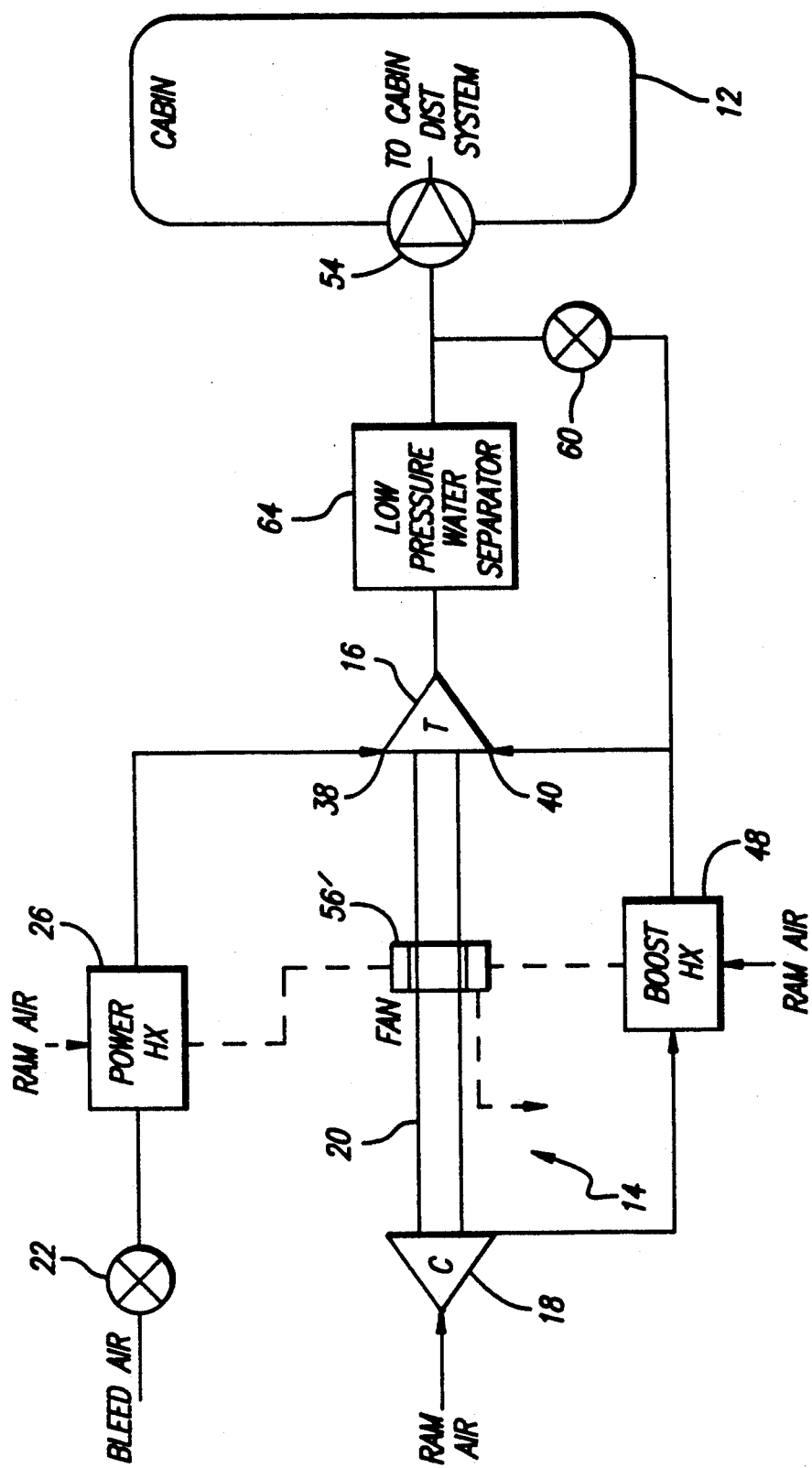
FIG. 4 is a schematic diagram similar to FIG. 1, but depicting one alternative preferred form of the invention.

FIG. 4 illustrates one alternative preferred form of the invention, wherein components corresponding with those shown and described with respect to FIGS. 1-3 are identified by common reference numerals. In this regard, FIG. 4 again depicts an air cycle machine 14 having a dual inlet turbine 16 and compressor 18 on a common shaft 20 for supplying conditioned air to an aircraft cabin 12. FIG. 4 further depicts a turbofan 56' mounted directly on the shaft 20 for auxiliary drive of the air cycle machine 14 on the ground and/or when engine bleed air is insufficient or unavailable. As previously described, the turbofan 56' can be used to draw precooling air through the heat exchangers 26 and 48. Alternately, or in addition, the various water extraction devices shown in FIG. 1 may be replaced by a single low pressure water separator 64 at a downstream side of the turbine 16. At high altitude operation, the supplemental fresh air flow from the compressor 18 is bypassed around the turbine 16 through the bypass valve 60 for mixture with the bleed air downstream of the turbine 16. As previously described, this fresh air bypass is accompanied by opening of the turbine scroll valve 44 to permit full circle bleed air admission to drive the turbine.

A variety of further modifications and improvements to the aircraft cabin air conditioning system of the present invention will be more apparent to those persons skilled in the art. Accordingly, no limitation on the invention is intended by way of the foregoing description and accompanying drawings, except as set forth in the appended claims.

What is claimed is:

1. In an aircraft having a cabin and a pressurized bleed air flow, a cabin air conditioning system, comprising:
   a turbine having a rotatable turbine wheel mounted within a turbine housing with a full circle turbine scroll for admission of airflow into driving relation with said turbine wheel defining a pair of housing inlets which are generally diametrically opposed to each other, and further including a turbine scroll valve mounted within said turbine scroll at a position generally opposite said one inlet and upstream from said other inlet, said turbine scroll valve being closed during said first mode whereby the bleed and supplemental air flows each flow into and fill a generally semi-annular half of the turbine scroll, said turbine scroll valve being open during said second mode whereby the bleed air flow fills substantially the entire full circle turbine scroll;
   a compressor mounted for rotation with said turbine to draw in and compress a supplemental air flow;
   means for supplying the bleed air flow to one of said turbine housing inlets for rotatably driving said turbine wheel and said compressor;
   means for supplying the bleed air flow to one of said turbine housing inlets for rotatably driving said turbine wheel and said compressor;
   means for supplying the supplemental air flow to the other of said turbine housing inlets to supplementally drive said turbine wheel during a first mode of operation, and for mixing the supplemental airflow with the bleed air flow at a downstream side of said turbine during a second mode of operation wherein said supplemental air flow supply means comprises a flow conduit for normally supplying the supplemental air flow from said compressor to said other turbine housing inlet, a bypass conduit connected between said flow conduit and the discharge side of said turbine, and a bypass valve for preventing passage of the supplemental air flow through said bypass conduit during said first mode, and for permitting supplemental air flow passage through said bypass conduit during said second mode; and
   means for supplying the bleed and supplemental air flow from the downstream side of said turbine to the aircraft cabin.

2. The cabin air conditioning system of claim 1 wherein said first mode of operation is relatively low altitude operation of the aircraft, and wherein said second mode of operation is relatively high altitude operation of the aircraft.

3. The aircraft cabin air conditioning system of claim 1 further including means for opening and closing said bypass valve.

4. The aircraft cabin air conditioning system of claim 1 wherein said supplemental air flow supply means further includes check valve means for preventing backflow of the bleed air flow from said turbine housing to said bypass conduit during said second mode.

5. In an aircraft having a cabin and a pressurized bleed airflow, a cabin air conditioning system, comprising:
   a turbine having a rotatable turbine wheel mounted within a turbine housing defining a substantially full circle turbine scroll for substantially full circle admission of air flow from a pair of inlets into driving relation with said turbine wheel, said inlets being disposed on said housing in generally diametrically opposed relation, and further including scroll valve means for bifurcating the turbine scroll into a pair of substantially semi-annular halves associated respectively with said pair of inlets during a first mode of operation;
   a compressor mounted for rotation with said turbine to draw in and compress a supplemental air flow;
   means for supplying the bleed air flow to one of said turbine housing inlets for rotatably driving said turbine wheel and said compressor;
   means for supplying the supplemental air flow to the other of said turbine housing inlets to supplementally drive said turbine wheel during the first mode of operation, and for mixing the supplemental air flow with the bleed air flow at a downstream side of said turbine during a second mode of operation; and
   means for supplying the bleed and supplemental air flow from the downstream side of said turbine to the aircraft cabin.

6. The aircraft cabin air conditioning system of claim 5 wherein said scroll valve means includes means for opening the turbine scroll to substantially full circle flow of the bleed air flow during said second mode.

7. The aircraft cabin air conditioning system of claim 5 further including means for extracting water from the bleed and supplemental air flows.

8. The aircraft cabin air conditioning system of claim 5 wherein the bleed air flow is obtained from at least one aircraft engine.

9. The aircraft cabin air conditioning system of claim 5 wherein the bleed air flow is obtained from an auxiliary power unit.

10. In an aircraft having a cabin and a pressurized bleed air flow, a cabin air conditioning system, comprising:

an air cycle machine having a turbine with a turbine wheel rotatably mounted within a turbine housing, and a compressor rotatably driven by said turbine wheel for drawing in and compressing a supplemental air flow, said turbine housing defining a substantially full circle turbine scroll for substantially full circle admission of air flow into driving relation with said turbine wheel, and said turbine housing further defining a pair of generally diametrically opposed air flow inlets;

means for supplying the bleed air flow to said turbine scroll through one of said inlets for rotatably driving said turbine wheel and said compressor;

means for supplying the supplemental air flow to said turbine scroll through the other of said inlets during a first mode of operation whereby the supplemental air flow cooperates with the bleed air flow to rotatably drive said turbine wheel and said compressor;

said turbine housing further including a scroll valve mounted within the turbine scroll at a position generally opposite to said one inlet and upstream from said other inlet, said scroll valve being closed during said first mode to bifurcate the turbine scroll into two generally semi-annular halves adapted respectively to receive the bleed and supplemental air flows; and bypass means including a bypass valve for bypassing the supplemental air flow from said other inlet directly to a discharge side of said turbine during a second mode of operation, said bypass valve preventing supplemental air flow bypass during said first mode;

said scroll valve being opened during said second mode to permit the bleed air flow to fill substantially the entire turbine scroll.

11. The aircraft cabin air conditioning system of claim 10 further including check valve means for preventing backflow of the bleed air flow from said turbine housing to said bypass means during said second mode.

12. The aircraft cabin air conditioning system of claim 10 further including means for extracting water from the bleed and supplemental air flows.

13. In an aircraft having a cabin and a pressurized bleed air flow, a method of providing conditioned air to the cabin, said method comprising the steps of:

rotatably driving a turbine with the bleed air flow to expand and control the bleed air flow prior to supply thereof as conditioned air to the aircraft cabin;

rotatably driving a compressor with the turbine to draw in and compress a supplemental air flow;

supplying the supplemental air flow to turbine during a first mode of operation to supplemental drive the turbine, and to expand and cool the supplemental air flow for supply thereof with the bleed air as conditioned air to the aircraft cabin;

bypassing the supplemental air flow from the turbine for mixture with the bleed air flow at a position downstream from the turbine during a second mode of operation, and for supply of the mixed bleed and supplemental sir flows as conditioned air to the aircraft cabin;

bifurcating a substantially full circle turbine housing scroll into a pair of generally semi-annular scroll halves, and supplying the bleed and supplemental air flow separately to the scroll halves during said first mode; and opening the turbine housing scroll for substantially full circle admission of the bleed air flow during said second mode.

14. The method of claim 13 wherein the first mode of operation is relatively low altitude operation of the aircraft, and wherein said second mode of operation is relatively high altitude operation of the aircraft.

* * * * *